(12) United States Patent
Nelson

(10) Patent No.: US 10,748,677 B1
(45) Date of Patent: Aug. 18, 2020

(54) SIGNAL TRANSMISSION CABLE CONFIGURABLE FOR VARIABLE ELECTROMAGNETIC FIELD EMISSION

(71) Applicant: Chris Lee Nelson, North East, PA (US)

(72) Inventor: Chris Lee Nelson, North East, PA (US)

(*) Notice: Subject to any disclaimer, the term of this patent is extended or adjusted under 35 U.S.C. 154(b) by 0 days.

(21) Appl. No.: 16/505,842

(22) Filed: Jul. 9, 2019

(51) Int. Cl.
*H01B 11/06* (2006.01)

(52) U.S. Cl.
CPC ..................... *H01B 11/06* (2013.01)

(58) Field of Classification Search
USPC .......................................................... 174/34
See application file for complete search history.

(56) References Cited

U.S. PATENT DOCUMENTS

| | | | |
|---|---|---|---|
| 1,475,878 A | 11/1923 | Rellstab | |
| 3,576,387 A * | 4/1971 | Derby | H01B 7/28 174/36 |
| 3,642,564 A * | 2/1972 | Walker | B05D 5/00 428/189 |
| 4,150,249 A * | 4/1979 | Pedersen | H01B 3/441 174/36 |
| 4,533,790 A * | 8/1985 | Johnston | H01B 11/1891 174/115 |
| 4,763,983 A * | 8/1988 | Keith | G02B 6/4422 156/158 |
| 4,815,814 A * | 3/1989 | Ulijasz | G02B 6/245 174/71 R |
| 4,952,020 A * | 8/1990 | Huber | G02B 6/4403 174/117 R |
| 5,042,904 A * | 8/1991 | Story | G02B 6/4416 174/107 |
| RE33,750 E * | 11/1991 | Lee | H01B 7/40 174/113 R |
| 5,412,864 A * | 5/1995 | Pack | H01B 7/385 174/23 R |
| 5,524,368 A | 6/1996 | Struck et al. | |
| 5,668,912 A * | 9/1997 | Keller | H01B 7/385 385/100 |
| 5,719,353 A * | 2/1998 | Carlson | H01B 7/385 174/102 P |
| 6,363,192 B1 * | 3/2002 | Spooner | G02B 6/4416 174/115 |

(Continued)

*Primary Examiner* — Timothy J Thompson
*Assistant Examiner* — Krystal Robinson
(74) *Attorney, Agent, or Firm* — The Law Office of Patrick F. O'Reilly, III, LLC

(57) ABSTRACT

A signal transmission cable configurable to allow variable electromagnetic field transmission along a length thereof is disclosed herein. The signal transmission cable includes at least one inner signal wire, the at least one inner signal wire configured to convey a signal originating from a signal transmitter; a shielding layer circumscribing the at least one inner signal wire, the shielding layer configured to prevent an electromagnetic field from escaping exteriorly from the signal transmission cable; and an outer protective layer circumscribing the shielding layer, the outer protective layer configured to prevent damage to the shielding layer and the at least one inner signal wire. One or more portions of the outer protective layer and the shielding layer are configured to be selectively removed by a user so as to enable the electromagnetic field emanating from the signal transmission cable to be varied.

12 Claims, 1 Drawing Sheet

(56) References Cited

U.S. PATENT DOCUMENTS

| | | | |
|---|---|---|---|
| 6,545,222 B2 * | 4/2003 | Yokokawa | G02B 6/4495 174/110 R |
| 6,563,990 B1 * | 5/2003 | Hurley | G02B 6/4422 385/101 |
| 6,603,908 B2 * | 8/2003 | Dallas | G02B 6/4495 385/100 |
| 6,621,448 B1 | 9/2003 | Lasky et al. | |
| 6,734,364 B2 * | 5/2004 | Price | H01B 7/0853 174/113 C |
| 7,196,271 B2 * | 3/2007 | Cornibert | H01B 11/06 174/113 C |
| 8,510,047 B2 | 8/2013 | Lomes | |
| 8,695,238 B2 | 4/2014 | Warchola et al. | |
| 9,113,300 B2 | 8/2015 | Marti et al. | |
| 9,202,610 B2 * | 12/2015 | Gould | H01B 7/295 |
| 9,640,300 B2 * | 5/2017 | Magner | H01B 13/06 |
| 10,084,556 B1 | 9/2018 | Young et al. | |
| 2005/0051355 A1 * | 3/2005 | Bricker | H01B 7/184 174/113 R |
| 2005/0288007 A1 | 12/2005 | Benco et al. | |
| 2007/0246239 A1 * | 10/2007 | Howe | H01B 11/06 174/34 |
| 2009/0114418 A1 * | 5/2009 | Smith | G09F 3/00 174/112 |
| 2012/0174445 A1 | 7/2012 | Jones et al. | |
| 2015/0136443 A1 * | 5/2015 | Rumsey | H01B 7/0823 174/117 F |
| 2017/0017234 A1 | 1/2017 | Wilson | |
| 2019/0278042 A1 * | 9/2019 | Blazer | G02B 6/4432 |

* cited by examiner

SIGNAL TRANSMISSION CABLE CONFIGURABLE FOR VARIABLE ELECTROMAGNETIC FIELD EMISSION

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a signal transmission cable. More particularly, the invention relates to a signal transmission cable configurable for variable electromagnetic field emission along a length thereof.

2. Background

To date, perimeter control of robotic functions has been limited to electromagnetic field (EMF) emissions from a single perimeter signal wire, yielding a constant signal produced by a transmitter, generally resulting in an unvarying singular response by the receiving mechanism. As such, conventional devices have not provided a way to vary EMF emissions, and therefore provide multiple signal commands, along the linearity of a signal cable, based upon changeable perimeter circumstances. This has severely limited the possible options for perimeter responses by robotic mechanisms.

Therefore, what is needed is a signal transmission cable with intermittently variable longitudinal EMF emission capabilities that allows for signal emission as desired along its length. Moreover, there is a need for a signal transmission cable with intermittently variable longitudinal EMF emission capabilities that has variably removable EMF shielding along its length. Furthermore, there is a need for a signal transmission cable with intermittently variable longitudinal EMF emission capabilities that has one or more signal wires.

BRIEF SUMMARY OF EMBODIMENTS OF THE INVENTION

Accordingly, the present invention is directed to a signal transmission cable that substantially obviates one or more problems resulting from the limitations and deficiencies of the related art.

In accordance with one or more embodiments of the present invention, there is provided a signal transmission cable configurable to allow variable electromagnetic field emission along a length thereof. The signal transmission cable includes at least one inner signal wire, the at least one inner signal wire configured to convey a signal originating from a signal transmitter; a shielding layer circumscribing the at least one inner signal wire, the shielding layer configured to prevent an electromagnetic field from escaping exteriorly from the signal transmission cable; and an outer protective layer circumscribing the shielding layer, the outer protective layer configured to prevent damage to the shielding layer and the at least one inner signal wire. One or more portions of the outer protective layer and the shielding layer are configured to be selectively removed by a user so as to enable the electromagnetic field emanating from the signal transmission cable to be varied.

In a further embodiment of the present invention, the at least one inner signal wire comprises copper.

In yet a further embodiment, the shielding layer comprises a metallic material.

In still a further embodiment, the metallic material of the shielding layer is aluminum.

In yet a further embodiment, the signal transmission cable further comprises an intermediate insulation layer disposed between the shielding layer and the at least one inner signal wire.

In still a further embodiment, the outer protective layer comprises a polymeric material or plastic.

In yet a further embodiment, the outer protective layer is attached to the shielding layer such that, when the one or more portions of the outer protective layer and the shielding layer are removed by the user, the one or more removed portions of the outer protective layer and the shielding layer are removed from the signal transmission cable together as a unit.

In still a further embodiment, the outer protective layer comprises a plurality of perforations or lines of weakness extending longitudinally along the length of the signal transmission cable, the plurality of perforations or lines of weakness configured to facilitate a removal of the one or more portions of the outer protective layer and the shielding layer from the remainder of the signal transmission cable.

In yet a further embodiment, the plurality of perforations or lines of weakness are circumferentially spaced apart from one another on the outer periphery of the outer protective layer so as to define a removable strip of the outer protective layer.

In still a further embodiment, the outer protective layer further comprises one or more tabs configured to be grasped by the user so as to facilitate a removal of the one or more portions of the outer protective layer and the shielding layer from the remainder of the signal transmission cable.

In yet a further embodiment, the signal transmission cable comprises a helical bundle of cables so that exposed signal wire electromagnetic field emissions are not significantly blocked by adjacent intact portions of the outer protective layer and the shielding layer.

In still a further embodiment, the signal transmission cable further comprises one or more interconnecting struts configured to maintain respective cables of the bundle of cables in a constant cross-sectional position relative to one another.

In yet a further embodiment, the at least one inner signal wire comprises a plurality of inner signal wires, the plurality of inner signal wires being circumscribed by the shielding layer.

In still a further embodiment, each of the plurality of inner signal wires are radially disposed and axially connected to one another.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
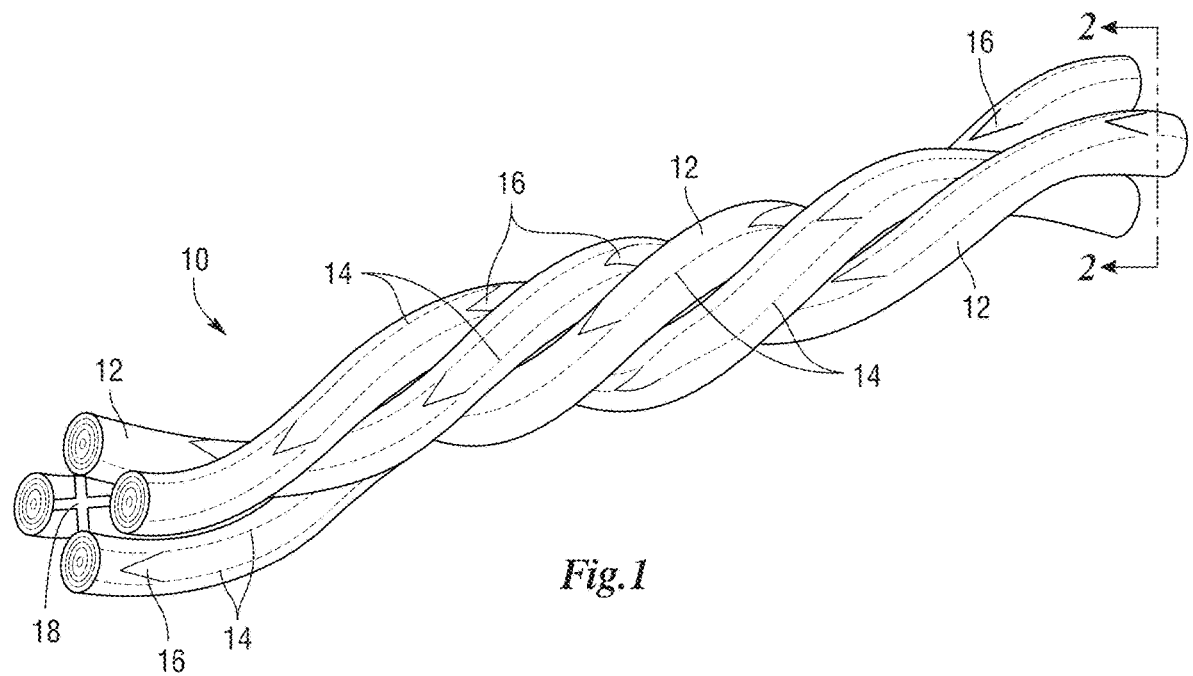
FIG. 1 is a perspective view of a plurality of signal transmission cables arranged in a helical bundle, according to an illustrative embodiment of the invention.

In one or more embodiments, the signal transmission cable is in the form of an electromagnetic field (EMF) signal transmission cable device, which includes at least one signal wire, or two or more radially disposed and axially connected signal wires, each of which is immediately surrounded by insulation and peripherally surrounded by an aluminum or other EMF blocking shield and enclosed by appropriate plastic or other in-ground durable casing. The casing may have outer radially disposed perforations or indents giving rise to longitudinally removable subsections with tear tabs conveniently disposed at appropriate intervals.

In these one or more embodiments, the signal transmission cable is in the form of an omnidirectional signal transmission cable that is capable of simultaneously carrying multiple EMF signals but with longitudinally variable emission capabilities.

There has thus been outlined, rather broadly, some of the features of the invention in order that the detailed description may be better understood, and in order that the present contribution to the art may be better appreciated. There are additional features of the invention that will be described hereinafter.

In this respect, before explaining at least one illustrative embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description, and should not be regarded as limiting.

Figure 2:
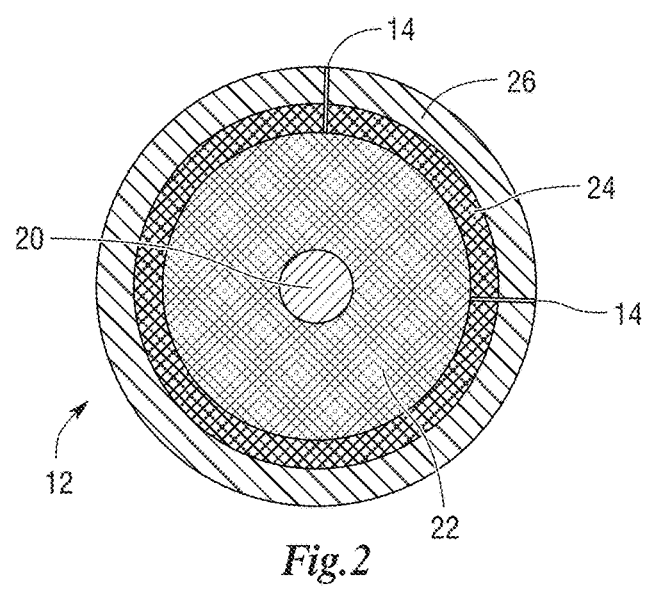
FIG. 2 is a sectional view cut through one of the signal transmission cables in the helical bundle, wherein the section is generally cut along the cutting-plane line 2-2 in FIG. 1.

An illustrative embodiment of a signal transmission cable is seen generally at 12 in FIGS. 1 and 2. The signal transmission cable 12 is configurable so as to allow variable electromagnetic field emission along a length thereof. The signal transmission cable 12 is suitable for both aboveground and underground usage. As shown in the cross-sectional view of FIG. 2, the signal transmission cable 12 generally comprises at least one inner signal wire 20, the at least one inner signal wire 20 configured to convey a signal originating from a signal transmitter; a shielding layer 24 circumscribing the at least one inner signal wire 20, the shielding layer 24 configured to prevent an electromagnetic field (EMF) from escaping exteriorly from the signal transmission cable 12; and an outer protective layer 26 circumscribing the shielding layer 24, the outer protective layer 26 configured to prevent damage to the shielding layer 24 and the at least one inner signal wire 20. One or more portions of the outer protective layer 26 and the shielding layer 24 are configured to be selectively removed by a user so as to enable the electromagnetic field emanating from the signal transmission cable 12 to be varied. That is, the signal transmission cable 12 is capable of being modified to allow intermittently variable EMF transmission along its length. In the illustrative embodiment, the signal transmission cable 12 may further comprise an intermediate insulation layer 22 disposed between the shielding layer 24 and the at least one inner signal wire 20.

As shown in the illustrative embodiment of FIG. 1, the signal transmission cable 12 may be arranged in a helical bundle of cables 10 so that exposed signal wire electromagnetic field emissions are not significantly blocked by adjacent intact portions of the outer protective layer 26 and the shielding layer 24. In FIG. 1, it can be seen that the helical bundle of cables 10 may comprise one or more interconnecting struts 18 for maintaining respective cables 12 of the bundle of cables 10 in a constant cross-sectional position relative to one another. Also, in the illustrative embodiment, the interconnecting radially disposed struts or cross members 18 are longitudinally shaped in a twisting fashion to allow for a helical disposition of the wires relative to one another (see FIG. 1). In the illustrative embodiment, the interconnecting struts 18 may be formed from a durable plastic material. In one or more embodiments, the outer protective layer 26 of the signal transmission cable 12 may be continuous with the radially disposed interconnecting struts 18, which maintain the spatial relationship of the various components. In other words, the interconnecting struts 18 may be formed together with the outer protective layer 26.

In FIG. 1, an exemplary four-signal wire cable device 10 is illustrated. In this illustrative example, each component signal wire is attached to the other wires via struts 18 made from an underground durable material (e.g., a suitable polymeric material or plastic). As will be described in detail hereinafter, perforations 14 facilitate the removal of the outer portion of the underground plastic shield 26 and its aluminum inner layer 24, of variable linearity, along with tabs 16 for tearing away these same two layers 24, 26, are illustrated. Also illustrated is the helical nature of the device 10 rotating on its long axis.

Now, referring again to the cross-sectional view of FIG. 2, the illustrative embodiment of the signal transmission cable 12 will be described in further detail. In the illustrative embodiment, the inner signal wire 20 of the signal transmission cable 12 comprises copper. More specifically, the signal wire 20 may be made from variably-gauged copper surrounded by the insulation layer 22. The insulation layer 22 may be formed from plastic, and be of underground-durable quality. In other embodiments, rather than including a single signal wire 20, the signal transmission cable 12 may comprise a plurality of inner signal wires 20, wherein the plurality of inner signal wires 20 are circumscribed by the shielding layer 24. In these other embodiments, each of the inner signal wires 20 may be radially disposed and axially connected to one another.

In the illustrative embodiment, the shielding layer 24 of the signal transmission cable 12 comprises a metallic material. As shown in FIG. 2, the signal blocking metallic shield 24 is layered immediately inside of the external underground plastic shield 26. The shielding layer 24 completely encircles the signal wire 20, thus blocking the electromagnetic field (EMF) from escaping exteriorly from the signal wire 20 of the signal transmission cable 12. In the illustrative embodiment, the metallic material of the shielding layer 24 is aluminum.

In the illustrative embodiment, the outer protective layer 26 of the signal transmission cable 12 comprises a polymeric material or plastic. As shown in FIG. 2, the external plastic shield 26 completely encircles the inner signal blocking metallic shield 24. In the illustrative embodiment, the outer protective layer 26 is attached to the shielding layer 24 such that, when the one or more portions of the outer protective layer 26 and the shielding layer 24 are removed by the user, the one or more removed portions of the outer protective layer 26 and the shielding layer 24 are removed from the signal transmission cable 12 together as a unit. Referring collectively to FIGS. 1 and 2, the outer protective layer 26 comprises a plurality of perforations 14 extending longitudinally along the length of the signal transmission cable 12. The plurality of perforations 14 facilitate a removal of the one or more portions of the outer protective layer 26 and the shielding layer 24 from the remainder of the signal transmission cable 12. That is, the outer portion of the shield 26, relative to the central axis of the cable 12, has optimally spaced perforations 14 that allow for removal of longitudinal segments of the outer portion of the shield 26 along with the signal blocking metallic shield 24 to expose the inner signal wire 20 and allow escape of the electromagnetic field (EMF). In FIGS. 1 and 2, it can be seen that the perforations 14 are circumferentially spaced apart from one another on the outer periphery of the outer protective layer 26 so as to define a removable strip of the outer protective layer 26 (see FIG. 1). In other embodiments, rather than perforations 14, the outer protective layer 26 may comprise lines of weakness or indents for facilitating a removal of the one or more portions of the outer protective layer 26 and the shielding layer 24 from the remainder of the signal transmission cable 12.

Turning again to the illustrative embodiment of FIG. 1, it can be seen that the outer protective layer 26 further comprises a plurality of tabs 16 that are configured to be grasped by a user so as to facilitate a removal of the one or more portions of the outer protective layer 26 and the shielding layer 24 from the remainder of the signal transmission cable 12. To facilitate this removal, these tabs 16 can be lifted, and the outer protective layer 26 is able to be torn in a longitudinal direction to the desired length.

In FIGS. 1 and 2, the signal wire 20 is centrally located, and is surrounded immediately by insulation layer 22. Surrounding the signal wire insulation 22 is the layer 24 of EMF signal blocking material, such as aluminum, which is applied to the inner encircling circumference of an underground durable plastic protective shield 26. The perforations 14 allow for linear or longitudinal pulling, removing, or tearing away of a certain length or portion of the outer plastic shield 26 and the intermediate inner layer of EMF signal-blocking shielding material 24.

Now, with reference again to FIGS. 1 and 2, the functionality and operation of the illustrative signal transmission cable 12 will be described. In a typical installation, the signal transmission cable 12 is carrying EMF originating from a transmitter attached to a loop made up of the signal wires 20 within the cable 12 for purposes of, for instance, radio frequency perimeter control of a device functioning within an encircled or somewhat confined area. Advantageously, the signal transmission cable 12 described herein has the ability to intermittently and linearly vary EMF emissions while the transmitter is sending constant, but individually signal-wire specific transmissions. Therefore, the device to be controlled can receive various transmitted signals depending upon which signal wire 20 has been exposed as a result of removal of its signal-blocking shielding 24 during installation.

As the signal transmission cable 12 is placed in the ground during installation, depending upon the specific signal desired at any predetermined location along the linearity of the current device 12, the outer plastic shield 26 and immediately enclosed aluminum or other metallic shielding material layer 24 are removed exposing the enclosed signal wire 20, allowing for escape of the particularly desired EMF. The signal being emitted in any particular location along the length of the device 12 can therefore be varied while the transmitter emits constant signals along each of the signal wires enclosed within the device 12. As shown in FIG. 1, the device 12 may be arranged in a bundle of cables 10 that is longitudinally helical so the exposed signal wire EMF emission is not significantly blocked by adjacent intact shielding material.

In one or more alternative embodiments, the various signal wires 20 and associated outer shields 26 are disposed in a planar or side-by-side fashion.

In yet one or more alternative embodiments, the signal transmission cable 12 allows for, during installation, complete unsheathing of a particular signal wire 20 chosen to emit an electromagnetic field (EMF) signal along a certain segment of the linearity of the cable 12, to be laid down beside the remaining portion of cable 12 which potentially includes other unexposed signal wires 20.

In still one or more alternative embodiments, the sizes, lengths, diameters, dimensions, and gauges of the individual components of the signal transmission cable 12 may vary depending upon application.

It is readily apparent that the aforedescribed signal transmission cable 12 offers numerous advantages. First, the signal transmission cable 12 has intermittently variable longitudinal EMF emission capabilities that allows for signal emission as desired along its length. Secondly, the signal transmission cable 12 has intermittently variable longitudinal EMF emission capabilities with variably removable EMF shielding along its length. Thirdly, the signal transmission cable 12 with intermittently variable longitudinal EMF emission capabilities may flexibly use one or more signal wires. Fourthly, the signal transmission cable 12 with intermittently variable longitudinal EMF emission capabilities is able to transmit multiple signals simultaneously. Finally, the signal transmission cable 12 with intermittently variable longitudinal EMF emission capabilities may be provided in the form of a cable bundle having a helical shape along its longitudinal axis so as to allow for more even radial radio frequency (RF) disbursement.

Advantageously, the aforedescribed signal transmission cable 12 allows for variable EMF emission along its linearity, thus allowing control over even a single signal wire. Also, the signal transmission cable 12 advantageously functions with any number of signal wires.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A signal transmission cable configurable to allow variable electromagnetic field emission along a length thereof, the signal transmission cable comprising:
    at least one inner signal wire, the at least one inner signal wire configured to convey a signal originating from a signal transmitter;
    a shielding layer circumscribing the at least one inner signal wire, the shielding layer configured to prevent an electromagnetic field from escaping exteriorly from the signal transmission cable; and
    an outer protective layer circumscribing the shielding layer, the outer protective layer configured to prevent damage to the shielding layer and the at least one inner signal wire;
    wherein one or more portions of the outer protective layer and the shielding layer are configured to be selectively removed by a user so as to enable the electromagnetic field emanating from the signal transmission cable to be varied;
    wherein the outer protective layer is attached to the shielding layer such that, when the one or more portions of the outer protective layer and the shielding layer are removed by the user, the one or more portions of the outer protective layer and the shielding layer are removed from the signal transmission cable together as a unit; and
    wherein the outer protective layer comprises a plurality of perforations or lines of weakness extending longitudinally along the length of the signal transmission cable, the plurality of perforations or lines of weakness extending through the outer protective layer and into the shielding layer, and the plurality of perforations or lines of weakness configured to facilitate the removal of the one or more portions of the outer protective layer and the shielding layer from the remainder of the signal transmission cable.

2. The signal transmission cable according to claim 1, wherein the at least one inner signal wire comprises copper.

3. The signal transmission cable according to claim 1, wherein the shielding layer comprises a metallic material.

4. The signal transmission cable according to claim 3, wherein the metallic material of the shielding layer is aluminum.

5. The signal transmission cable according to claim 1, further comprising an intermediate insulation layer disposed between the shielding layer and the at least one inner signal wire.

6. The signal transmission cable according to claim 1, wherein the outer protective layer comprises a polymeric material or plastic.

7. The signal transmission cable according to claim 1, wherein the plurality of perforations or lines of weakness are circumferentially spaced apart from one another on the outer periphery of the outer protective layer so as to define a removable strip of the outer protective layer.

8. The signal transmission cable according to claim 1, wherein the outer protective layer further comprises one or more tabs configured to be grasped by the user so as to facilitate a removal of the one or more portions of the outer protective layer and the shielding layer from the remainder of the signal transmission cable.

9. The signal transmission cable according to claim 1, wherein the signal transmission cable comprises a helical bundle of cables so that exposed signal wire electromagnetic field emissions are not significantly blocked by adjacent intact portions of the outer protective layer and the shielding layer.

10. The signal transmission cable according to claim 9, further comprising one or more interconnecting struts configured to maintain respective cables of the bundle of cables in a constant cross-sectional position relative to one another.

11. The signal transmission cable according to claim 1, wherein the at least one inner signal wire comprises a plurality of inner signal wires, the plurality of inner signal wires being circumscribed by the shielding layer.

12. The signal transmission cable according to claim 11, wherein each of the plurality of inner signal wires are radially disposed and axially connected to one another.

* * * * *